3,707,523
POLLUTION CONTROL IN PHOSPHATE
SLIME DISPOSAL
Howard Patrick Ledden, Rowayton, Conn., and Klaus Muller, Cranbury, N.J., assignors to American Cyanamid Company, Stamford, Conn.
No Drawing. Filed Aug. 19, 1970, Ser. No. 65,284
Int. Cl. E02d 3/12
U.S. Cl. 260—41 R                                              1 Claim

ABSTRACT OF THE DISCLOSURE

Presorption of small amounts of anionic polyelectrolyte flocculants such as a 35% hydrolyzed-COONa-polyacrylamide of about 15 million weight average molecular weight onto sand tailings from the processing of phosphate ore improves the subsequent settling and solidification on mixing with phosphate slimes. The rate of settling, homogeneity and filterability of the settled slime-sand layer are improved under many conditions of slime concentration, sand to slime ratio and flocculant to slime ratio. Anionic flocculants are better than nonionics or cationics. Fly ash can be used as a siliceous substrate to replace sand, and although there are similarities to sand, the response to the cationic-anionic character of the polyelectrolyte is different.

BACKGROUND OF THE INVENTION

Major quantities of phosphatic clays result from mining operations in the phosphate industry. Deposits of phosphates are mined to produce phosphate fertilizers or phosphoric acid, or red or white phosphorus, for chemical, agricultural and other usage. In major mining operations, overburden is stripped and then the ore itself excavated with a drag line. After screening, flotation and other steps, the pebble phosphate is recovered as a useful product and a residue is left which consists of primary and secondary slimes and sands from processing steps.

After the separation of the useful product, the residual phosphatic slimes are usually present in aqueous suspension from which it is desired that water be recovered for reuse, and that the slimes be discarded at minimum cost. Although generalized mining operations in Florida are similar, the examples herein are with particular reference to the Chicora mine of the America Cyanamid Company, Brewster plant, near Bradley, Fla. In common with the rest of the Florida phosphate mining operations, there is produced a slime which frequently is about 1% solids and which can be thickened to the order of 5% solids in a thickener, a tank with a diameter in the order of 500 feet, in which the aqueous slimes are fed in, and permitted to settle. Settling is to about 5% solids. The slimes are about ⅔ clay and contain considerable phosphate values, which cannot be economically recovered, with enough aluminum salts to readily hydrolyze to give gelatinous products with the slimes being about 99% or more by weight of a particle size smaller than −150 mesh. This is a size which will pass through a screen having square holes of about 105 microns on a side. The slimes have in the order of 100 square meters per gram of surface area and the particles readily retain a surface layer of bound water. This layer of bound water is such that from the standpoint of static settling, the particles have an apparent diameter when wet far greater than their apparent diameter when dry and the specific gravity is much closer to that of water. Similarly, the bound water layer tends to keep the slime particles at a distance and as a result, settling to a solids content of greater than 5% occurs very slowly and normally is not accomplished in a settling tank but rather in large disposal basins which are formed by dams with the slimes permitted to complete settling in the final disposal area.

In the past, the slimes in such slime disposal areas have increased in density with some water run-off. There may be a crust formed from the evaporation of water at the surface. Usually even after years, retained water and added water from rainfall keeps the crust a comparatively light surface, although it looks deceptively solid. Men, animals and farm equipment fall through the crust into the slimes below, and hence the disposal area is a dangerous trap for years. It is customary to fence off such areas which results in a surface pollution problem with comparatively large surface areas being unsuitable for agricultural, recreational or industrial usages for many years. Some such disposal areas are still non-load bearing and dangerous after 30 years. The present system of phosphate mining has not given tailing slimes with much greater age, but from extrapolation it seems that the disposal areas will remain as a useless area and hence a pollution problem for generations. The increased volume due to water being present is such that a greater volume of slimes is obtained than that of the ore processed, and hence dikes are used to dam ponds used for tailing disposal with the attendent risk of dam failure, with the slimes being released to flow out and contaminant adjacent areas. With straightforward settling, the slimes which are discharged from the mill at about 1% solids leave the thickeners at around 5% solids and ultimately will reach densities of between 25 and 40%, but they remain fluids so that they flow under light pressure and do not attain useful solid characteristics within a period of many years.

The sands are derived as a residue from the treatment of phosphate rock with water, with separation of pebble phosphate, and is a moderately course silica with the surface area of in the order of 1 square meter of a gram. A typical sieve analysis is:

| Mesh: | Weight percent |
|---|---|
| +20 | .6 |
| −20+35 | 5.3 |
| −35+50 | 28.0 |
| −50+70 | 32.6 |
| −70+100 | 14.9 |
| −100+200 | 15.8 |
| −200+325 | 2.6 |
| −325 | .1 to .2 |
| | 100.0 |

BRIEF DESCRIPTION OF THE PERTINENT PRIOR ART

The interaction of polyelectrolytes and finely divided materials is the subject of much prior art, both patents and publications. It is a field given to broad and inconsistent statements at least in part resulting from unwarrantly broad generalizations based upon fragmentary information in specific fields.

2,533,166, Jones, Process for Polymerizing Water-Soluble Polyacrylamides and Poly-Alpha-Substituted Acrylamides, Dec. 5, 1950, discloses a method of producing polyacrylamides having a high peptizing action to "prevent the sedimentation of finely divided materials such as pigments and silver halide dispersed in aqueous media." (Column 1, lines 27–29).

2,660,303, J. F. Haseman, Selective Flocculation of Colloidal Phosphate Ore in the Presence of Clay, Nov. 24, 1953, discloses the use of starch for the selective flocculation of colloidal phosphate particles from colloidal clay and other colloidal matrix impurities, with common flocculating agents resulting in a gel.

2,687,374, Mowry and Hedrick, Filtration Method, Aug. 24, 1954, discloses the use of polyelectrolytes including polyacrylamide and polyacrylic acid to aggregate soil to form a filter.

2,745,744, Weidner and Dunlap, Treating Agents Incorporation, May 15, 1956, discloses polyelectrolytes in papermaking and to cause colloidal dispersed solids to adhere to cellulose and other fibers in a water suspension.

2,754,623, Mowry and Hedrick, Erosion-Stable Soil, July 17, 1956, discloses polyacrylamide, polyacrylic acid and certain other polymers added to soil to prevent erosion and improve growth characteristics.

2,868,618, Oberg and Le Baron, Method of Concentrating Mineral Values, Jan. 13, 1959, gives a description of certain phases of phosphate mining including analyses of certain types of materials and mentions the use of hydrolyzed polymerized acrylonitrile among other items for thickening of —200 mesh material.

2,981,630, Rowland, Clay Products and Fractionation Treatment of Heterogeneous Aggregates such as Clay, Apr. 25, 1961, discloses the use of hydrophilic colloidal material including the sodium salt of hydrolyzed acrylonitrile which have a selective flocculating effect on clays to divide thixotropic and dilatent clays to select clays with specific characteristics for paper coating. Some types of clays are flocculated and settled under conditions which keep other clays in suspension, to provide a separation of a clay with desired characteristics.

3,080,264, Zimmie et al., Method of Removing Silt from Tanks, Mar. 5, 1963, shows polyelectrolytes with a molecular weight of 100,000 to 15,000,000 for removing accumulations of silt and mud from ballast tanks. Here the polymer mechanically aids in causing the mud and silts to remain in a pumpable form.

3,118,832, Katzer and Pye, Control of Silt Load and Scouring in Flowing Streams, Jan. 21, 1964, shows using polyacrylamide and hydrolyzed polyacrylamide to control the deposition of silt loads in flowing streams.

3,128,249, Pye and Schura, Method for Clarifying Water, Apr. 7, 1964, shows the combined use of bentonite and acrylamide copolymers in clarifying turbid water.

3,312,070, Matsuo et al., Method of Making Reclaimed Ground With Coagulative Surface Active Agents, Apr. 4, 1967, shows the use of coagulative surface active agents, including polyacrylamide to a hydraulic dredging operation in which the polyelectrolyte is added to a fluid mixture of solid earth particles, of specified size ranges, as these materials are suspending in water, passed through a pipe and deposited as an earth fill, with the polymer causing the solids to deposit more rapidly and more homogeneously than would otherwise be the case, with the polymer being added from 50 to 200 meters from the end of the discharge pipeline.

3,418,237, Booth and Dobson, Settling of Non-Agrillaceous Ore Pulps and Mineral Suspensions by use of Water-Soluble Acrylic Polymers, Dec. 24, 1968 (filed Dec. 22, 1953), shows copolymers of acrylamide and acrylic acid with a molecular weight of at least 10,000 for improving settling filtration and characteristics of predominantly non-agrillaceous ore pulps and mineral suspensions. The references cited, including those added by a Certificate of Correction, not herein specifically listed, are hereby incorporated by reference.

3,419,502, Newman, Process for Dispersing Solids in an Aqueous System, Dec. 31, 1968, shows a process for dispersing and maintaining a dispersion of various solids that occur in surface waters. A partially hydrolyzed polyacrylonitrile having a molecular weight of not greater than 40,000 is shown.

3,434,970, Siegele et al., Selective Flocculant in Drilling Muds, Mar. 25, 1969, shows specific polymers of acrylic acid and acrylamide to increase oil well drilling efficiency, with the drilling fluid being such that drill cuttings separate rapidly but a sodium bentonitic clay remains in the drilling fluid.

3,508,407, Booth, Mine Backfill Process, Apr. 28, 1970, shows polyelectrolytes including hydrolyzed polyacrylamide to retain cement fines with coarser particles in mine backfilling operations, and increase the homogeneity of mineral solids, particularly ore tailings, which are backfilled into a mine with the cement being added to give greater strength. The polyelectrolyte aids in preventing slimes and cement from flowing out thereby leaving a classified mixture with the coarser sands in one location and the slimes and cement in another.

3,524,682, Booth, Coal Suspension Pump Using Polyelectrolytes, Aug. 18, 1970, shows the use of poly(acrylamide-acrylic acid) and other polyelectrolytes to cause large and small particles to separate out together, and prevent the classification of particles which are comparatively coarse, that is over 65 mesh, while leaving fine particles, that is less than 325 mesh suspended. In pipe lines for instance the separation of the large particles tends to give a non-resuspendable material in invert syphons with the fine materials remaining on top as a separate layer, and attendant clogging of pipes. A decision in the prosecution In re Booth CCPA, 405 F2d 588, 160 USPQ 328 discusses phosphate processing.

Canadian 589,543, Booth, Flocculation of Aqueous Polyacrylamides, Dec. 22, 1959, discloses the maintaining of polyacrylamide in aqueous solution from time of manufacture until use, thus preventing the degradation of polymer characteristics from the mechanical aspects of drying and handling.

Some patents such as Australian 163,501 and Australian 163,502 disclose the use of polyelectrolytes for flocculating clays without clearly distinguishing the types of clays being treated.

A series of papers by V. K. LaMer and R. H. Smellie and others including a paper in the Journal of Colloid Science 13, 589–599 (1958) entitled Flocculation, Subsidence and Filtration of Phosphate Slimes, VI. A Quantitative Theory of Filtration of Flocculated Suspensions discusses the interaction of flocculants and slimes including phosphate slimes.

The use of sands from a phosphate mine to aid in the solidification of land-fill compositions by mixing with the slimes is disclosed in U.S. application Ser. No. 24,090, Mar. 31, 1970, C. C. Cook and E. M. Haynesworth Land-Fill Composition and Process for Preparing same.

The present invention expands the utility of this land-fill process by permitting the addition of sand over wide ranges of concentration.

If the sands alone are added to the slimes, if the concentration of the sands is too low, the sands will channel through and if the concentration is too high, the sand will accumulate on the surface.

The use of the present polymers on the sand permits versatility of mixing with the sands and slimes remaining sufficiently homogeneous to settle in a compact form, which has useful load bearing characteristics. After the comparatively small time of a few weeks, with adequate drainage the land-fill will support men, cattle and farm equipment. In the absence of sands, the slimes will remain a quicksand like trap for man, animals and equipment for years.

The problem is discussed in Building Land With Phosphate Wastes, Richard C. Timberlake, Mining Engineering December 1969, pages 38 to 40.

For systems of inert solids in a viscous fluid, Stoke's law gives the rate of fall. When a small sphere falls under the action of gravity through a viscous medium it ultimately acquires a constant velocity, $$V = \frac{2ga^2(d_1-d_2)}{9\eta}$$

where $a$ is the radius of the sphere, $d_1$ and $d_2$ the densities of the sphere and the medium respectively, and $\eta$ the coefficient of viscosity. V will be in cm. per sec. if $g$ is cm. per sec.$^2$, $a$ in cm., $d_1$ and $d_2$ in g per cm.$^3$ and $\eta$ in dyne-sec per cm.$^2$ or poises.

Here, the particles, particularly in the presence of the polyelectrolyte have a layer of bound water, which increases their effective size, and reduces the difference in density. Also, and probably more importantly, Stoke's law is only valid where each falling particle is unaffected by adjacent particles. In the present systems, enough particles are present so that each is affected by its neighbors. This is called hindered settling as each particle hinders the movements of its neighbors. Such systems often have too many uncontrollable variables for effective rigorous theoretical treatment, and empirical results are fitted to generalized equations.

For many of the uses described in the prior art, the rate of flocculation or settling or filtration is critical and is described from the standpoint of plant processes. Some of the prior art either specifically excludes clays, or limits the particular operation to specific types, and classes of clays, because clays are a broad class and do not all act alike.

In the present invention, in land-fill operations, a period of weeks or months for settling and compaction is completely acceptable. This is orders of magnitude greater than plant practice permits in process vessels. A period of at least one month can be taken as distinguishing land-fill operation times from any plant processing operation.

The problems of hydration of various components including added polyelectrolytes is such that the entire concept is out of the range of which Stoke's law is useful.

DESCRIPTION OF INVENTION

It is now found that by adding a polyelectrolyte to the sands, and then mixing the sands with phosphate mine slimes, there is obtained an admixture of said sands and slimes which will compact, with the release of water to a fill material which is sufficiently strong to support men and cattle as well as mechanized farm equipment usually within a few months.

It is found that if the polymer is added to a mixture of sands and slimes, the tremendous surface area of the slimes, as compared with the sands, adsorbs and hence requires an uneconomically large quantity of polyelectrolyte. Additionally the polyelectrolyte may tend to bind water and maintain fluidic characteristics which are undesirable for the present purposes.

In contradistinction if the polyelectrolyte is adsorbed on the sands, it tends to bind the slimes to the surface of the sands so that the sands carry the slimes down with them and yield a mixture which in a month or longer becomes sufficiently rigid to support useful loads.

It has been previously taught that adding the sands to the slimes of certain density will result in the sands intermingling with the slimes and carrying the slimes down to form a compact fill. The use of a polyelectrolyte greatly expands the useful operable range of solids concentration of the slimes suspension which can be compacted, and useful results can be economically obtained more readily.

In the very useful range of 5% to 10% slime solids, the polyelectrolyte prevents classification of the sands, with the sands settling out first, and leaving the slimes as a residual layer above the settled sands.

For best results, the sands are treated with the polyelectrolyte and added to the slimes just before the materials are deposited in the settling basin. If the suspension of sands, polyelectrolyte, and slimes is too vigorously agitated, the polyelectrolyte bonds between the sands and the slimes may be ruptured under conditions such that reconstitution does not rapidly occur and additional polyelectrolyte must be added or a larger original polyelectrolyte usage results.

Much of the previous work on the interaction of polyelectrolytes and finely divided materials has to do with flocculation procedures in which a comparatively rapid settling is desired—that is a matter of at most a few hours. In the present invention, polyelectrolytes may be used to cause a rapid flocculation or thickening as an initial step, and fluidization and homogenization occur in the sense that any sands in the slimes are kept suspended so that the sands do not settle out separately; but the important consideration in the present invention is the increased density of the settled materials which is now a land-fill, and stabilization to the point that the surface of the land-fill will support men, animals and equipment.

A preliminary separation of some water occurs rapidly but the settling and stabilization to give a bearing surface requires considerable time often in the matter of months. Stabilization within a year or two is perfectly satisfactory and a tremendous improvement on disposal of the slimes without the sands being incorporated.

Most conveniently, the sands to be incorporated are residual fractions from the phosphate mining operations, including all sands (about $-20$, $+325$ mesh) which do not appear in the product. As these solid materials too must be placed on tailing piles, the ratio of the sands to slimes is conveniently such as to dispose of all of the discarded fractions from the phosphate mining and milling operation.

The phosphate operation sands may be augmented or replaced by sand size particles from other sources. For instance fly ash from a power plant may be used in conjunction with the slimes to form a stable land-fill. One fly ash was found to have a somewhat smaller particle size, about 11.3 square meters per gram as contrasted with 1.1 square meters per gram of phosphate sands and was quite acidic having a pH of 3.6. In a settling test with fly ash, the supernatant liquid was immediately clear whereas with sand the supernatant was usually turbid or hazy for the first three hours and did not become clear until after standing for several hours. Water washing or acid washing to remove acidic substitutents followed by sufficient water washing to remove the acid gave a product which had improved slime solidification characteristics as contrasted with fly ash as obtained from stacks. The acid washing had no particular advantages in the settling rate, but did result in better homogeneity of the settled slime-fly ash.

The differences in behavior with flocculants, particularly anionic, and cationic flocculants illustrates a sensitivity of settling systems to changes in the siliceous surface and the polyelectrolyte used in homogenizing the land-fill.

The polyelectrolytes used in the present invention are preferably those of the polyacrylamide type in which the polyacrylamide is partially hydrolyzed. For purposes of convenience these flocculants can be identified by the weight average molecular weight and the percentage of carboxamide groups which are hydrolyzed to carboxy groups. Whether the carboxy group is present as an acid or a salt is normally relatively immaterial. Other cations are present so that whether a salt or the free acid, in aqueous solution when ionized, the material in effect is anionic in character with the cations dissociated. Among the polyelectrolytes which are useful are substantially unhydrolyzed polyacrylamide with a molecular weight in the range of 3 to 5 million; a substantially unhydrolyzed polyacrylamide with a molecular weight in the range of 12 to 15 million; a copolymer or hydrolysis product of polyacrylamide which has a molecular weight of 5 to 8 million with about 30% acrylic acid groups and 70% acrylamide groups which flocculant is anionic in character; a similar product about 7% hydrolyzed with a molecular weight of about 15 million; a similar product about 18% hydrolyzed and a molecular weight of about 15 million; a similar product of about 35% hydrolyzed and a molecular weight of 15 million; a 70% hydrolyzed product with a molecular weight of about 200,000; polyacrylic acid with a molecular weight of 9 to 10 million; and for comparison cationic polymers one of them methylamine-epichlorohydrin copolymer with a molecular weight of about 100,000 and a polyacrylamide having about 20% cationic copolymer present in a molecular weight of 2 to 3 million.

Obviously the product itself is more important than the method of making as for example effectively the same polymer can be produced by polymerizing acrylonitrile followed by hydrolysis; or hydrolyzing acrylonitrile to acrylamide polymerizing the acrylamide and hydrolyzing part of the acrylamide groups on the polyacrylamide or hydrolyzing the acrylonitrile to both acrylamide and acrylic acid and copolymerizing the acrylamide and acrylic acid. Where desired, other materials may be polymerized into the chain such as diallyl dimethyl ammonium chloride, vinyl pyridine, vinyl acetate, styrene, vinyl ethers, vinyl halides, or unsaturated hydrocarbons such as isobutylene.

The hydrolyzed polyacrylamides are preferred, with up to about 40% hydrolysis of the amide groups. As long as the material is sufficiently water soluble to be readily dispersed into the system, the upper molecular weight limit is not controlling. Weights of at least 20 million are sufficiently soluble and are commercially obtainable. Molecular weights as low as 100,000 are useful but preferably the molecular weight is over about 2 or 3 million. Because in a material of this type, the method of determining molecular weights is at best only indicative, ranges are used instead of specific values. It is also to be understood that it is a weight average molecular weight, and that there is a range between molecules in the mixture because a single molecular species cannot be routinely obtained.

Polyacrylamide, polyacrylic acid and hydrolyzed polyacrylonitrile have the general formula:

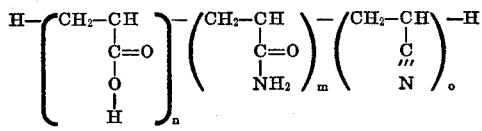

where $n$, $m$ and $o$ are whole numbers, and the groups within the parentheses occur in random order and orientation, $n$ is at least 3, and $o$ may be zero, and $m$ may be zero, but preferably $m$ is greater than $n$. The groups can be referred to as carboxyethylene, carbamylethylene and nitriloethylene, respectively. The carboxy group, of course, can exist as its salt, and as an alkali salt such as sodium or in solution in ionized form, and such forms are the natural and inherent equivalent of the carboxy form itself in the present suspension system, as enough cations of various salts are present in the solids and water to react with free carboxyl groups, to form salts. The free acid with polyacrylamide, or the sodium salt of hydrolyzed polyacrylonitrile are frequently preferred commercially.

The polyelectrolytes are somewhat slow to dissolve, so in accordance with conventional practice are preferably added as a solution of 1% polymer in water, or more dilute. A 0.1% solution is readily handled, and easily added and mixed into the sands.

The slimes are about two-thirds clay and about one-third phosphate with enough aluminum to have gelatinous products on hydrolysis.

The slimes as obtained from the refining operation are often about 1% solids, which can be settled to 5% to 7% rather conveniently in a thickener.

As taught in the application S.N. 24,090, Cook et al., supra, if the slimes at 5% solids are pumped out into a settling area, and permitted to stand until a density is reached of at least about 11%, sands may be added on the surface, and the sands and the slimes will compact homogeneously. If the slimes are at less than about 11%, the sands will fall through, classify and separate out first.

The present invention shows that the polyelectrolyte when added to the sands permits the addition of the sands which are treated with the polyelectrolyte in the range of from about 0.05 to 0.5 pound of polyelectrolyte per ton of slimes and the sands when added to the slimes at as low as about 5% solids will cause the slimes to adhere to the sand particles and settle essentially homogeneously in not more than a few months, as water is decanted off the surface or flows out from beneath, so that there is obtained a land-fill which will stand the weight of men walking across the landfill.

The land-fill is a fertile material which because of the phosphates and other components in the slimes allows full agricultural use within a matter of a few years, thus eliminating the dikes, and the ponds, from maintenance problems, and the liability for pollution of the surface, and in fact is reclaimed effective agricultural land. When any of the anionic flocculants above mentioned are used, a solid surface is obtained. The anionic flocculants are preferred as a more readily handled material which forms a suitable load bearing surface faster is obtained.

It is again to be stressed that the prime advantage of the present process is to obtain an agricultural grade landfill which will stand weight of men and cattle and farm equipment within a time of a maximum of a year or two. Even if the flocculants are not particularly useful for flocculating clays, that is in causing the clays to separate rapidly within a matter of a few minutes to leave a clear supernatant; the polymers here mentioned in conjunction with sands cause the slimes to adhere to the sands so that the stable land-fill is obtained within a matter of not more than a year or two.

Because the flocculant is susceptible to damage by agitation, it is preferred that the flocculant be added to the sand as about a 0.1 to 0.5% aqueous solution and carried along with a minimum of agitation—in other words not fed through a centrifugal pump or pumped through a pipe where high turbulence prevails, and mixed with the slimes just prior to the slimes being deposited in the land-fill area. If the flocculant is mixed with the sands earlier or if the sands and slimes are mixed earlier, either a longer time may be required for stabilization to load bearing capacity or a larger polymer usage may be required to compensate for such agitation.

In an experiment showing land-fill operations, a slime from the Chicora mine above mentioned is fed into a thickener and thickened to about 7% slime solids; and the slime solids pumped by a centrifugal pump through a pipe line about 2 miles long to a disposal area. A sand effluent containing about the same weight of sand solids in about half volume of water is simultaneously pumped to the same area and about 500 feet from the end of the sand slurry is added 0.1 pound per ton of slime solids of a 35% hydrolyzed polyacrylamide having a molecular weight of about 15 million. The two streams are fed through a Y, in effect the familiar "Siamese Connection" of Firement, and distributed onto a land-fill area. The resulting mixture spread out as a thin suspension but with the sands and the slimes remaining essentially homogeneous. During a period of six months, the water drains from the land-fill, and the remaining land-fill is sufficiently solid for men and cattle to walk across the surface. When seeded, the fill is found to support farm crops.

We claim:
1. A process for preparing a reconstituted land-fill of bearing strength sufficient to support men, cattle and farm equipment within a period of several months which comprises:
 (a) just before deposition in a land-fill area, admixing waste slimes from phosphate ore processing operations, said slimes consisting essentially of an aqueous suspension of solid particles at least 99% by weight of which on a dry basis have a particle size smaller than 105 microns (−150 mesh), said suspension having a solids content of from about 5% to about 25% by weight at the time of admixing, and, per part by weight on a dry basis of said slimes,
 (b) from about 0.8 to about 5 parts, by weight on a dry basis, of waste tailings, that is the sands from an ore processing operation, said tailings comprising solid particles at least 95% by weight on a dry basis of which have a particle size in the range of 105 to 1000 microns (—16 +150 mesh), (c) said sands having added thereto, per ton of slime solids, about 0.05 to 0.5 pound of a polyacrylamide which is up to 40% hydrolyzed and has a molecular weight of at least 1,000,000, and (d) separating the water released from said mixture, for at least one month, until the solids compact enough to possess load bearing characteristics.

References Cited

UNITED STATES PATENTS

| | | | |
|---|---|---|---|
| 3,312,070 | 4/1967 | Matsuo et al. | 210—54 |
| 3,508,407 | 4/1970 | Booth | 61—35 |
| 3,524,682 | 8/1970 | Booth | 241—15 |

MORRIS LIEBMAN, Primary Examiner

J. H. DERRINGTON, Assistant Examiner

U.S. Cl. X.R.

61—35, 36; 260—41 A